US009398160B2

(12) United States Patent
Rist et al.

(10) Patent No.: US 9,398,160 B2
(45) Date of Patent: Jul. 19, 2016

(54) METHOD AND COMMUNICATION TERMINAL FOR PROVIDING VOIP

(75) Inventors: Claus Rist, Bochum (DE); Otto Schröter, Essen (DE)

(73) Assignee: Unify GmbH & Co. KG, Munich (DE)

(*) Notice: Subject to any disclaimer, the term of this patent is extended or adjusted under 35 U.S.C. 154(b) by 1718 days.

(21) Appl. No.: 12/308,498

(22) PCT Filed: Jul. 4, 2007

(86) PCT No.: PCT/EP2007/056715
§ 371 (c)(1),
(2), (4) Date: Jul. 30, 2010

(87) PCT Pub. No.: WO2008/003711
PCT Pub. Date: Jan. 10, 2008

(65) Prior Publication Data
US 2010/0290453 A1 Nov. 18, 2010

(30) Foreign Application Priority Data

Jul. 5, 2006 (DE) .......................... 10 2006 031 080

(51) Int. Cl.
*H04L 12/66* (2006.01)
*H04M 7/00* (2006.01)
*H04L 29/06* (2006.01)

(52) U.S. Cl.
CPC ....... *H04M 7/0012* (2013.01); *H04L 29/06027* (2013.01); *H04L 65/1043* (2013.01); *H04L 65/4007* (2013.01)

(58) Field of Classification Search
CPC . H04W 74/04; H04W 76/005; H04W 76/022; H04W 76/026; H04W 76/04; H04W 84/12; H04L 65/1006; H04L 65/1069; H04L 65/1053; H04L 29/06027; H04L 51/066; H04L 65/1046; H04L 12/5835; H04L 65/1009

USPC .......... 370/252, 254, 259, 352; 379/242, 251, 379/265.01, 265.09
See application file for complete search history.

(56) References Cited

U.S. PATENT DOCUMENTS

2003/0043988 A1* 3/2003 Booton .................... 379/207.02
2004/0062271 A1* 4/2004 Oliver et al. .................. 370/466
(Continued)

FOREIGN PATENT DOCUMENTS

EP 1179941 A2 2/2002

OTHER PUBLICATIONS

Wu Chou et al.: "Web Service for Tele-Communication, Telecommunications", 2005, AICT-ICIW '06, International Conference on Internet and Web Applications and Services/Advanced International Conference on Guadelope, French Caribbean Feb. 19-25, 2006, Piscataway, NJ, USA, IEEE, Feb. 19, 2006, pp. 88-88, XP010898643, ISBN: 0-7695-2522-9.
(Continued)

*Primary Examiner* — Melanie Jagannathan
*Assistant Examiner* — Najeebuddin Ansari
(74) *Attorney, Agent, or Firm* — Buchanan Ingersoll & Rooney PC (57) ABSTRACT

The invention relates to a method for providing Voice over IP (VoIP) in a communication system with a number of terminals operating with VoIP, between which a transmission of voice data according to VoIP or a signalling is achieved, wherein the signalling is achieved using the Computer Supported Telecommunication Application (CSTA) interface standard. Telephone services can be controlled by a computer using the CSTA protocol. As for conventional application, H323 protocol and SIP are used for IP telephony processing of audio/video streams of a conversation. The invention is based on replacing H323 protocol and SIP by a CSTA protocol only when the latter is correspondingly extended.

19 Claims, 6 Drawing Sheets

(56) References Cited

U.S. PATENT DOCUMENTS

| | | | |
|---|---|---|---|
| 2004/0066926 A1* | 4/2004 | Brockbank et al. | 379/207.13 |
| 2004/0228328 A1* | 11/2004 | Potter et al. | 370/352 |
| 2004/0264676 A1* | 12/2004 | Lambrigts et al. | 379/230 |
| 2005/0123117 A1* | 6/2005 | Stockdale | 379/207.02 |
| 2005/0144621 A1* | 6/2005 | Millbery | 719/310 |
| 2005/0174987 A1* | 8/2005 | Raghav et al. | 370/351 |
| 2006/0101146 A1* | 5/2006 | Wang | 709/227 |
| 2006/0133349 A1* | 6/2006 | Kan et al. | 370/352 |

OTHER PUBLICATIONS

Sinnreich H. et al.: "Internet Communications Using SIP, passage Basics of SIP Security, Internet Communications Using SIP: Delivering VoIP and Multimedia Services with Session Initiation Protocol", New York, John Wiley & Sons, US, 2001, pp. 110-113, XP002464944, ISBN: 0-471-41399-2.

"Using CSTA for SIP Phone User Agents (uaCSTA)", ETSI TR 102 348, ETSI Standards, European Telecommunications Standards Institute, Sophia-Antipolis, FR, vol. ECMATC32, Nr. V111, Sep. 2004, pp. 1-75; XP014015637, ISSN: 0000-0001.

Wu Chou et al.: "WIP: Web Service Initiation Protocol for Multimedia and Voice Communication over IP", Web Services, 2006, ICWS '06, International Conference on, IEEE, PI, Sep. 2006, pp. 515-522, XP031002125, ISBN: 0-7695-2669-1.

Gurbani V.K. et al.: "SIP: A Routing Protocol", Bell Labs Technology, Bell Laboratories, Murrey Hill, NJ, US, vol. 6, Nr. 2, 2002, pp. 136-152, XP001132336, ISSN: 1089-7089.

Vineet Kumar et al.: "IP Telephony with H.323"—Architectures for unified Networks and Integrated Services, IP Telephony with H.323, Architectures for Unified Networks and Integrated Services, New York, John Wiley & Sons, US, 2001, pp. 416-419, XP002464943, ISBN: 0-471-39343-6.

Standard ECMA-348; 2nd Edition/Jun. 2004 "Web Services Description Language (WSDL) for CSTA Phase III".

"RTP Payload Format for MPEG-4 Audio/Visual Streams" Y. Kikuchi, T. Nomura, S. Fukunaga, Y. Matsui, H. Kimata; dated Nov. 2000; http://tools.ietf.org/html/rfc3016.

"RTP Payload for DTMF Digits, Telephony Tones and Telephony Signals" H. Schulzrinne, S. Petrack dated May 2000; http://tools.ietf.org/rfc/rfc2833.

* cited by examiner

| IPAddress | IP:Port |
|---|---|
| MediaMode | Voice, Video, Data, ... |
| Codec | G.711, ... |

FIG 6B

| Interval_1 |
|---|
| Frequency_1 |
| Level_1 |
| ... |
| Interval_n |
| Frequency_n |
| Level_n |

METHOD AND COMMUNICATION TERMINAL FOR PROVIDING VOIP

CROSS REFERENCE TO RELATED APPLICATIONS

This application is the US National Stage of International Application No. PCT/EP2007/056715, filed Jul. 4, 2007 and claims the benefit thereof. The International Application claims the benefits of German application No. 10 2006 031 080.2 filed Jul. 5, 2006, both of the applications are incorporated by reference herein in their entirety.

FIELD OF INVENTION

The invention relates to a method for providing VoIP and to a communication terminal for implementing the method according to the claims.

BACKGROUND OF THE INVENTION

It is known how to transmit voice data arising within the scope of a telephone call with the aid of networks based on what is termed the Internet Protocol. Voice-data transmitting of said kind is referred to also as "Voice-over-IP" (VoIP).

VoIP terminals, which are enabled for said type of voice-data transmitting, meanwhile as a rule offer the same added-value services as are made available by terminals belonging to classical telephony.

One of said added-value services is "Computer Telephony Integration" (CTI). It serves to enhance efficiency during voice transmissions. Very simple applications such as computer-supported call-number dialing as well as others ranging as far as all call-center functions can be offered as services by means of CTI services. CTI basically provides a way of supporting telephone services using computer technology. Apart from providing support for features along with their various call-processing functions, that also includes controlling and monitoring private automatic branch exchanges and call-detail recording.

A CTI platform usually includes fault-resistant servers and supports ITU recommendations H.100 and H.110. Functional features customarily include intelligent, network-enabled call-processing controlling as well as the automating of controlling and monitoring functions within a call center, software- and database-controlled functions for automatic call distributing, and mechanisms for logging and displaying stored and evaluated contact data.

Various manufacturer-developed CTI platforms have appeared over the years that have been standardized by different standardizing bodies. There are therefore numerous standards that exhibit a certain mutual dependency. CTI is on the one hand based on known standards such as ISDN and, on the other, defines hardware-structure standards and interface standards. Computer Supported Telecommunications Applications (CSTA) is an instance of an interface standard of said type. CSTA establishes the structure and nature of messages for various service features such as toggling, call diversion, and three-way conferencing.

Methods employed hitherto for providing VoIP services use what is termed the Realtime Transport Protocol (RTP) as that is a protocol for continuously transmitting audio-visual data (streams) over IP-based networks. The protocol was first standardized in 1996 within RFC 1889. A revised RFC was published in 2003. RFC 3550 hence replaces RFC 1889.

RTP is a packet-based protocol and is usually operated over UDP. For IP-telephony applications, the H.323 and SIP protocols are used for negotiating parameters for the call's audio/video streams. H.323 and SIP are therein employed substantially as the signaling protocol between VoIP-enabled terminals (VoIP phones) and to VoIP-enabled computers such as PCs, PDAs, and laptops.

That approach to providing VoIP requires synchronizing between the VoIP protocols and CTI protocols in a VoIP-providing server through additional program-specific measures.

SUMMARY OF INVENTION

The object of the present invention is hence to disclose an improved method for providing VoIP.

With the inventive method for providing Voice-over-IP (VoIP) in a communication system having a multiplicity of terminals that function according to VoIP and between which the transmitting of voice data is realized using VoIP or, as the case may be, signaling, signaling takes place based on the Computer Supported Telecommunication Applications (CSTA) interface standard.

The H.323 and SIP VoIP protocols known from the prior art are advantageously replaced by said inventive method. What further takes advantageous effect therein is that CSTA has to undergo only slight modifications to be expanded into the complete VoIP protocol. CSTA furthermore enjoys a high level of acceptance among operators because it is an ECMA and ISO standard. That at the same time also insures greater compatibility. CSTA is also very flexible and, owing to its structure, especially suitable for what are termed non-voice services such as, for instance, fax, data, or video transmission. Client applications moreover eliminate the need for synchronizing between VoIP and CTI since signaling takes place entirely within the scope of handling in keeping with a single protocol.

Signaling according to CSTA is in an advantageous development carried out such that within the scope of an exchange of CSTA messages that is initiated through calling-up of CSTA services that takes place for establishing a VoIP connection, the CSTA messages each have at least one item of information concerning VoIP-related realtime data added to them. A simple measure replacing the H.323 and SIP protocols is provided thereby.

At least data that is necessary in keeping with the Realtime Transport Protocol for transmitting a data stream is therein preferably added as the information concerning VoIP-related realtime data. Exact representing of the replaced protocols by CSTA will be made possible thereby.

The minimum data necessary for VoIP communication will advantageously inventively be available if the data is added organized such as to identify source-related information conveying at least an IP address, a port number, and a type of media and/or codec employed.

Data defining at least signaling tones is alternatively or additionally added as the information concerning VoIP-related realtime data. That development has the advantage of giving the addressed terminal the possibility of generating the signaling tones itself.

Data defining the signaling tones is therein added organized such that at least one tone is identified by information that relates to the tone requiring to be generated and conveys at least a frequency, an interval, and/or a tone level. Minimum information necessary for signaling generation will be made available to the device by said development.

The method can alternatively or additionally be embodied also such that data defining the VoIP-related realtime data is transmitted as a function of at least one property of the recipient as data streams formatted in keeping with the RTP protocol. What is made possible by that advantageous embodiment is that in the event, for example, of the receiving or, as the case may be, addressed terminals' being a communication server the tone data can be transmitted as an RTP data stream and, in the event of their being a communication terminal, said data can be added as separate tone information. Signaling that is matched to the system will hence be insured thereby.

If conversion is carried out at the source side into VOIP protocols that differ from CSTA, in particular H.323 or SIP, then the inventive method can advantageously be employed also in heterogeneous communication systems.

The signaling taking place in keeping with CSTA can also be transmitted in encrypted form, in particular over what is termed a "Transport Layer Security" (TLS) socket, so that data security will be insured.

Further data securing will be obtained alternatively or additionally by transmitting the data embodied in keeping with RTP and added within the scope of CSTA encrypted, in particular in keeping with Secure RTP.

The necessary encryption information is therein preferably transmitted with the aid of CSTA signaling so that the functionalities already present in CSTA can be advantageously exploited here, too. In another advantageous embodiment of the method, operating modes, in particular what is termed a Stimulus mode or Functional mode, of the terminals are realized with the aid of CSTA signaling. That will also support the basic inventive notion of minimizing the number of protocols necessary for VoIP in a low-expenditure manner.

The Stimulus mode is therein preferably realized on the basis of the "Physical Device Feature and Event" functionalities provided by CSTA and the Functional mode is preferably realized on the basis of the "Call Control Services and Events" functionalities provided by CSTA. That approach will enable the cited operating modes to be realized in a simple manner without any major modifications.

The inventive communication device is characterized by means for implementing the method and has the advantage of enabling the implementation thereof in a communication system.

BRIEF DESCRIPTION OF THE DRAWINGS

The invention is further described by the drawings identified below.

DETAILED DESCRIPTION OF INVENTION

Figure 1:
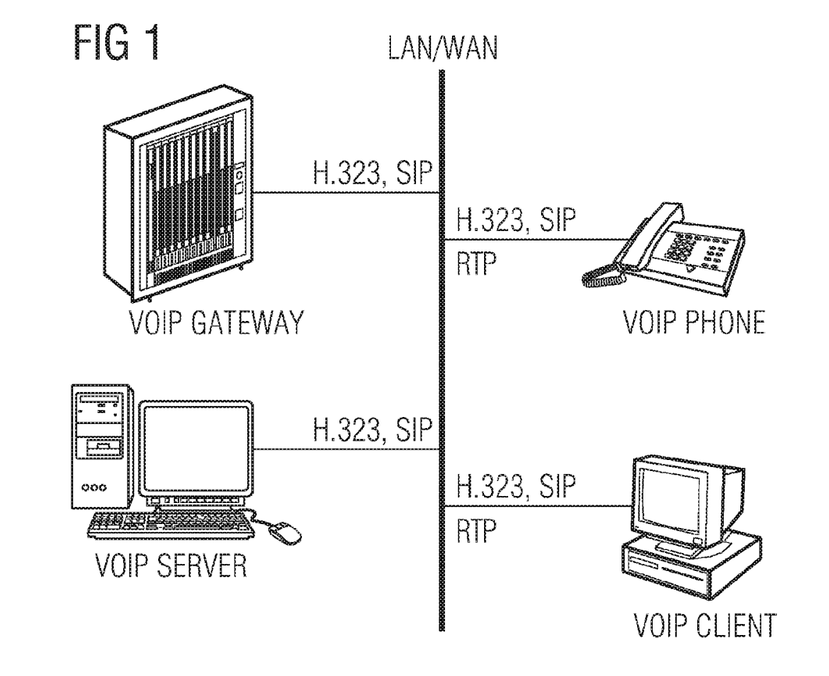
FIG. 1—shows a Voice-over-IP VOIP SYSTEM of the kind underlying the inventive method.

Shown in FIG. 1 is what is termed a Voice-over-IP VOIP SYSTEM of the kind underlying the inventive method, with for the present purpose just a single representative of the terminals typically operated in such a system being shown.

Belonging thereto is a telephone VOIP PHONE, a computer such as, for instance, a PDA or laptop or possibly a desktop PC VOIP CLIENTS, a server VoIP Server enabling the Voice-over-IP services, and an interface device that establishes a connection between the Voice-over-IP system VOIP SYSTEM shown and a telephone network, connected in each case via a local network or Wide Area Network LAN/WAN.

The H.323 and SIP protocols are therein preferably used as the signaling protocol between the terminals shown. Proprietary software protocols can alternatively also be used. That approach, however, will require a homogeneous infrastructure.

Exclusively what is termed the Realtime Transport Protocol RTP is used for an exchange of data such as voice, data packets or video and multimedia applications and other applications, referred to also as what is termed the payload, with said protocol taking place in what is termed an end-to-end connection between the participating terminals.

Figure 2:
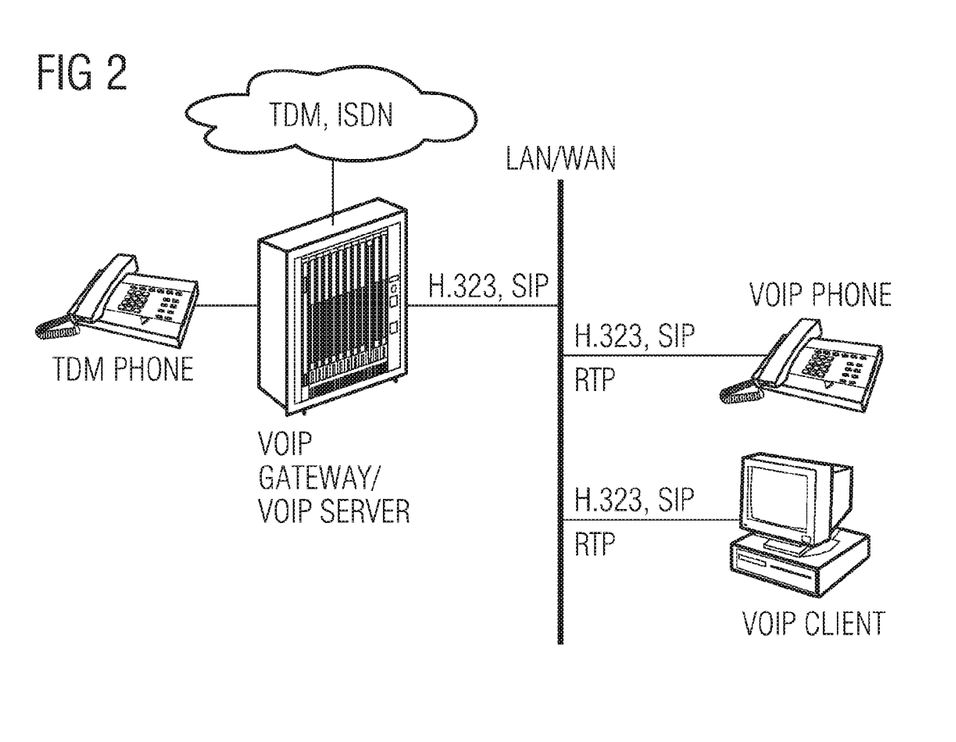
FIG. 2—shows the functionality of the gateway VOIP GATEWAY, as utilized in the underlying VOIP SYSTEM.

Shown in more detail in FIG. 2 for elucidating the underlying Voice-over-IP system VOIP SYSTEM is the functionality of the gateway VOIP GATEWAY.

What can be seen therein is that connected to the gateway VOIP GATEWAY is a telephone that belongs to the category of classical time-division multiplex TDM terminals or, as the case may be, is connected to trunk lines into the public telephone network TDM, ISDN so that interworking is made possible between the Voice-over-IP network LAN/WAN and classical terminals belonging to the telephony domain.

Alongside gateway functionality, gateways VOIP GATEWAY, as shown in FIG. 2, frequently also offer the function of a server, which is indicated in FIG. 2 through omission of the server VOIP SERVER.

Whenever an interworking point of what is termed the payload is switched over from communication in keeping with Voice-over-IP to communication in keeping with the classical TDM method, or vice versa, a digital signal processor must for that conversion operation therein be intermediately connected by the interface device or, as the case may be, gateway. The gateway resources are therein controlled via a central Computer Telephony Integration CTI interface, with what is termed synchronizing between the Voice-over-IP network LAN/WAN and CTI protocols having to take place in the Voice-over-IP server VOIP SERVER and the terminals VoIP CLIENT as a rule by means of program-specific measures.

Figure 3:
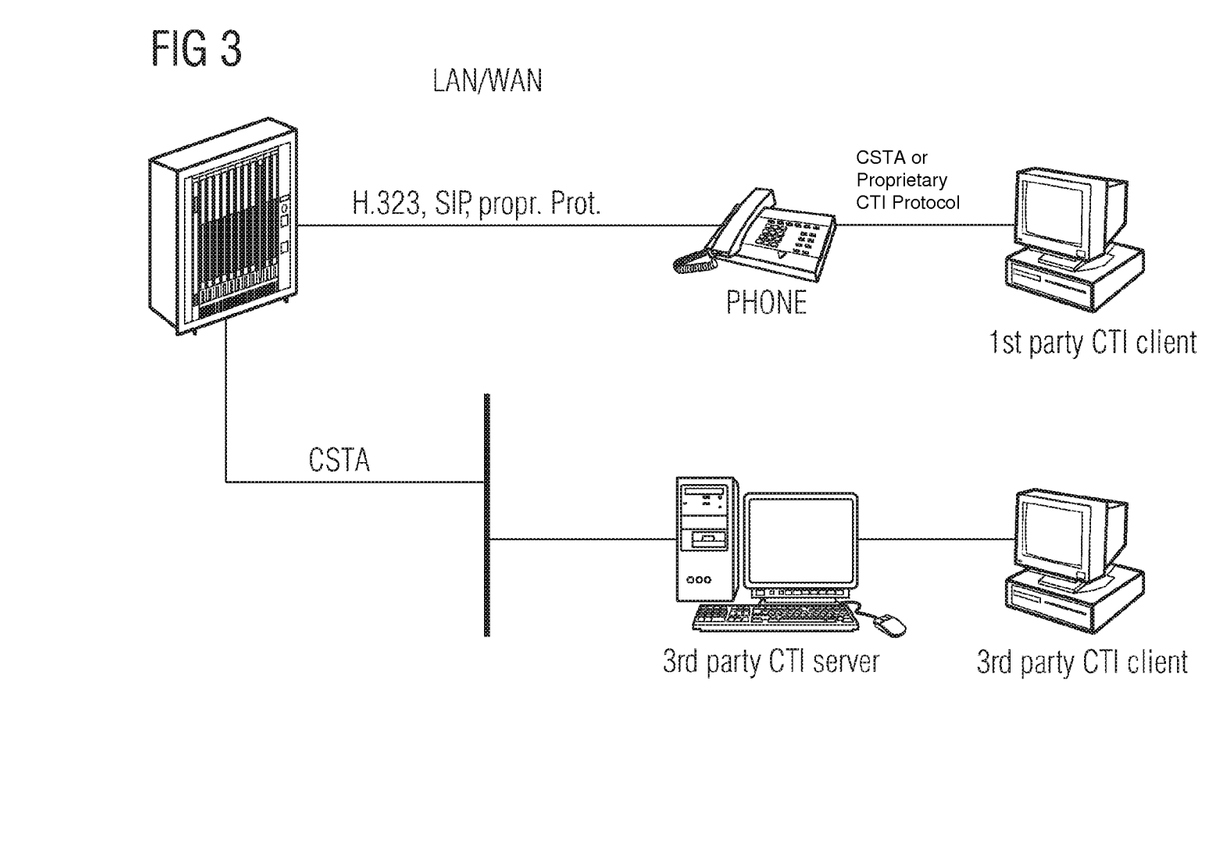
FIG. 3—shows a schematic of a Computer Telephony Integration system (CTI SYSTEM)

Shown in FIG. 3 for elucidating what are termed Computer Telephony Integration systems is a schematic of a system CTI SYSTEM of said type.

In systems CTI SYSTEM of said type, what are termed CTI interfaces by means of which a computer such as, for example, a PC, PDA, or laptop can control or, as the case may be, monitor a telephone are made available within known communication systems in addition to the above-explained signaling protocols to the terminal.

What is as a rule employed therein is what is termed the Computer Supported Telecommunication Applications CSTA protocol which defines all the necessary services for handling and monitoring calls. The central CTI link via a CTI server is therein referred to as what is termed the Third Party Control.

Alternatively thereto there is also the First Party Control where the controlling computer PC exchanges CTI messages directly with the controlled terminal. That functionality basically made available in keeping with the CSTA protocol is, though, frequently not used but, instead, replaced by a proprietary protocol.

First Party Control CTI applications of said type are therein frequently programs that relate to a terminal requiring to be controlled or, as the case may be, considered. What is termed a dialing aid can here be cited as an example.

In contrast thereto, Third Party applications; which consist of a server and a client component, relate to groups that contain a plurality of terminals or even all connected terminals of the communication system replacing the Third Party Server such as, for example, in the case of a call center or for central call-detail recording.

Figure 4:
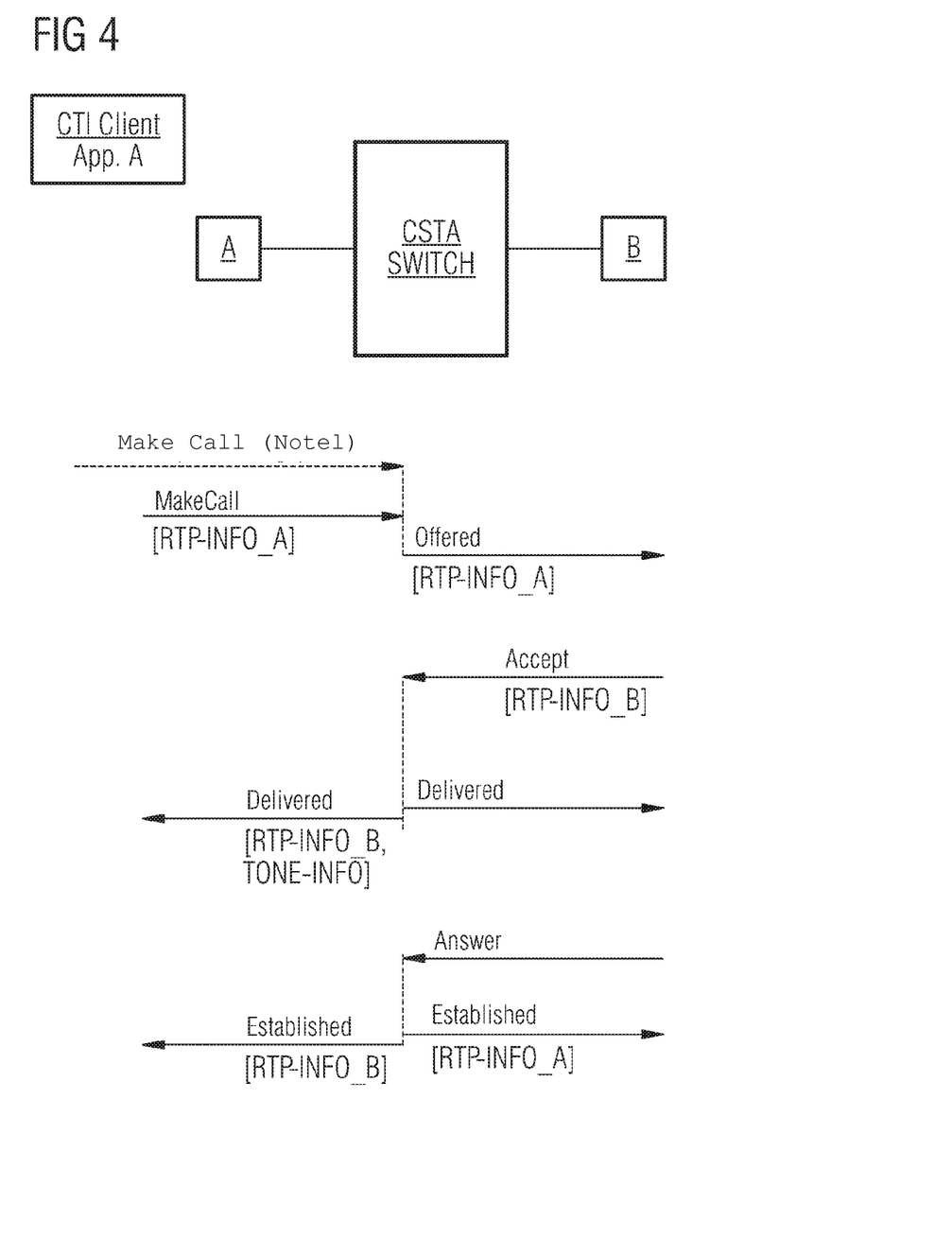
FIG. 4—shows an exemplary embodiment of the inventive method showing the inventive CSTA protocol expansion.

Shown, finally, in FIG. 4 is an exemplary embodiment of the inventive method showing the inventive CSTA protocol expansion which, according to the invention, is effected such that RTP information needed for the Voice-over-IP VoIP payload is transported via the CSTA protocol so that separate signaling protocols such as the cited H.323 or SIP will no longer be required.

What is inventively exploited therein is that complete controlling and monitoring of a terminal is already possible with the existing CSTA protocol so that all operating actions can be performed by a CTI client.

According to the invention a terminal CSTA Signaling Device is therein enabled by the inventive method to render different operating modes usable for the terminal so that both a pure Functional mode as well as a pure what is termed Stimulus mode is possible alongside a mixture of said two cited operating modes (hybrid terminal).

Proceeding from a schematically represented arrangement consisting of a CTI client, a first terminal A, what is termed a CSTA switch, and a second terminal B, FIG. 4 therein shows how an inventively expanded CSTA message exchange is effected.

What can be seen is that a call is initiated at a first instant 1, which results in a MakeCall message that can be transmitted from the CTI Client CTI CLIENT to the CSTA SWITCH, which is to say, therefore, is triggered by a First Party or Third Party CTI application. That can alternatively be effected directly from the first terminal A. In the example shown, that is also the case, as is indicated by the arrow's having been drawn continuously from the first terminal A to the CSTA SWITCH. What can be seen is that simultaneously with the MakeCall call the terminal also receives RTP information RTP-INFO_A relating to the first terminal, the result of which is that at an ensuing step the CSTA SWITCH transmits an Offered message to a second terminal B, which message likewise contains said RTP information RTP-INFO_A. At a second instant 2 an Accept message is then transmitted by the second terminal B, which message for its part contains RTP information RTP-INFO_B relating to the second terminal. Said message transmitted to the CSTA SWITCH at an ensuing step triggers a Delivered message that is signaled to the second terminal B, as well as a Delivered message that is delivered to the first terminal A, with the Delivered message delivered to the first terminal inventively containing the RTP information RTP-INFO_B relating to the second terminal B and additionally a ring-signaling display in what is termed tone information TONE INFO.

At a third instant the second terminal B sends what is termed an Answer message to the CSTA SWITCH, which at ensuing steps transmits an Established message to both the first terminal A and the second terminal B, with RTP information RTP-INOF_B relating to the second terminal B being inventively contained in the Established message sent to the first terminal and RTP information RTP-INFO_A relating to the first terminal A being included in the Established message sent to the second terminal B.

Figure 5:
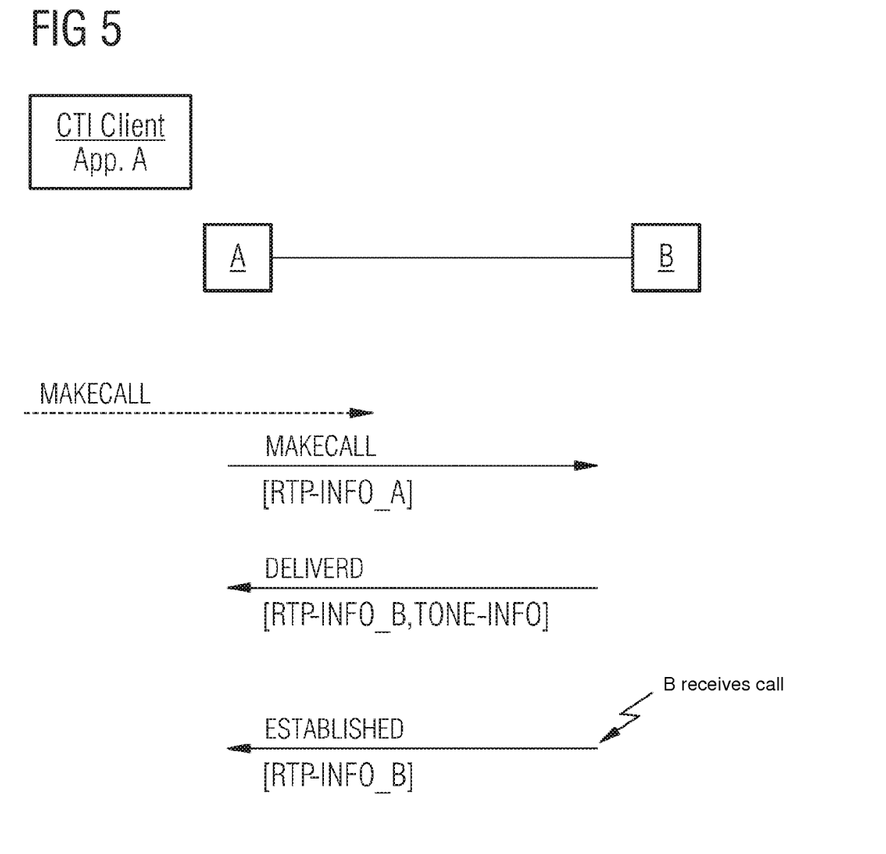
FIG. 5—shows use of the inventive method with a peer-2-peer periphery.

Proceeding from said inventive method, an application or, as the case may be, use is possible owing to what is termed a peer-2-peer periphery, as will be explained with the aid of FIG. 5.

What can be seen therein is that the first terminal A and second terminal B have a connection without a switch, but that a CTI client is again present that can initiate a call, although in the exemplary embodiment shown that is effected by the first terminal A.

What can be seen therein is that in the messages transmitted from the first terminal A to the second terminal B again contain the respective RTP information RTP-INFO_A, RTP-INFO_B relating to the terminal A, B emitting the message and are transmitted directly to the respective partner A, B.

Figure 6A:
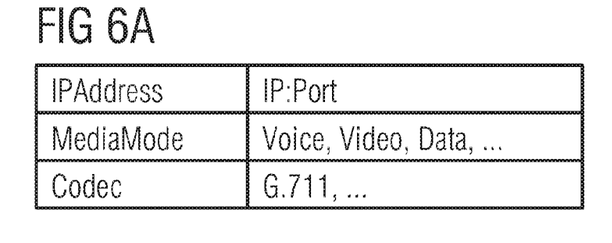
FIG. 6A—shows a possible structure of the RTP information.

Shown in FIG. 6 is an example of the inventive protocol expansion of the CSTA protocol. What can on the one hand be seen therein in FIG. 6a is a possible structure of the RTP information. Said structure contains an IP address field IP ADDRESS, a flag MEDIA MODE identifying the content of the transmitted data, and details of the codec CODEC used.

The invention is therein not limited to the structure shown. Rather it is even the case that basically any information necessary for setting up bidirectional RTP streams is transmitted by way of RTP information.

Figure 6B:
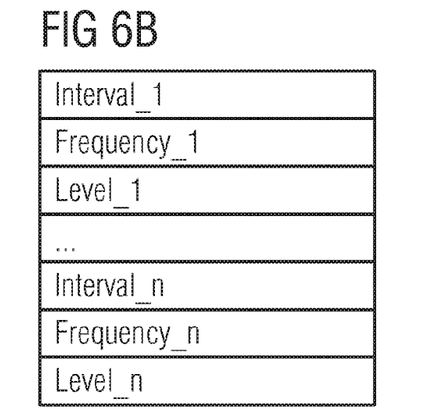
FIG. 6B—shows by way of example the structure of a tone-information element TONE INFO.

FIG. 6b, on the other hand, shows by way of example the structure of a tone-information element TONE INFO.

Said element is therein used in place of or as a supplement to the RTP information field in the case, for instance, of the Delivered event when signaling tones are to be generated locally. Said element is therefore a conditionally occurring message.

The field can therein be structured such that an interval of the tone requiring to be generated is contained in a first field and said tone's frequency, what is termed the third level of the tone, is contained in a second field. That can continue up to a tone N.

It is therein inventively provided for the information relating to the tones requiring to be generated to be included in either the RTP information element or the tone-information element TONE INFO, depending on the recipient. For example in the event that tones are to be used by a communication server, instead of the tone information it is necessary to send RTP information containing corresponding tone information, which is to say, therefore, that the tones will in that case be transmitted in an RTP stream, the result of which is that after the Established event, changeover has to take place from the communication server's RTP channel to the other terminal point's RTP channel.

Figure 7:
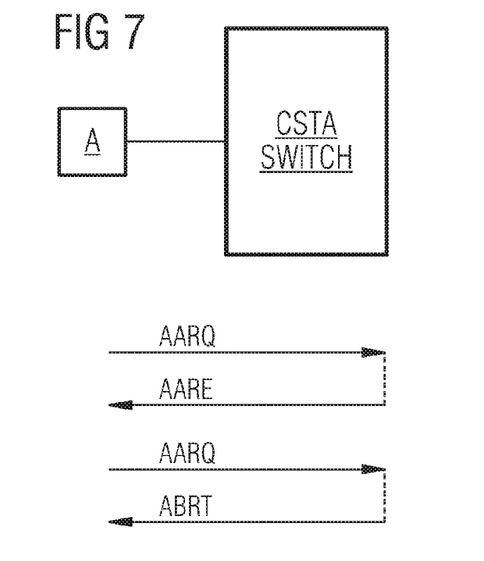
FIG. 7—shows the inventive expansion of the CSTA protocol.

In FIG. 7, the inventive expansion of the CSTA protocol or, as the case may be, its application for Voice-over-IP can advantageously also be used for registering, which takes place through authentication by entering a user ID and user account so that registering through a Voice-over-IP protocol can also be completely replaced by standard CSTA mechanisms.

Proceeding from a first terminal A that is connected to a CSTA switch, an Association Control Service Element Request AARQ is therein responded to with an ACSE Response AARE so that a CSTA link will be switched to active if authentication was correct. If that is not the case, the CSTA switch will respond with an ACSE Abort message ABRT and the request is rejected.

Figure 8:
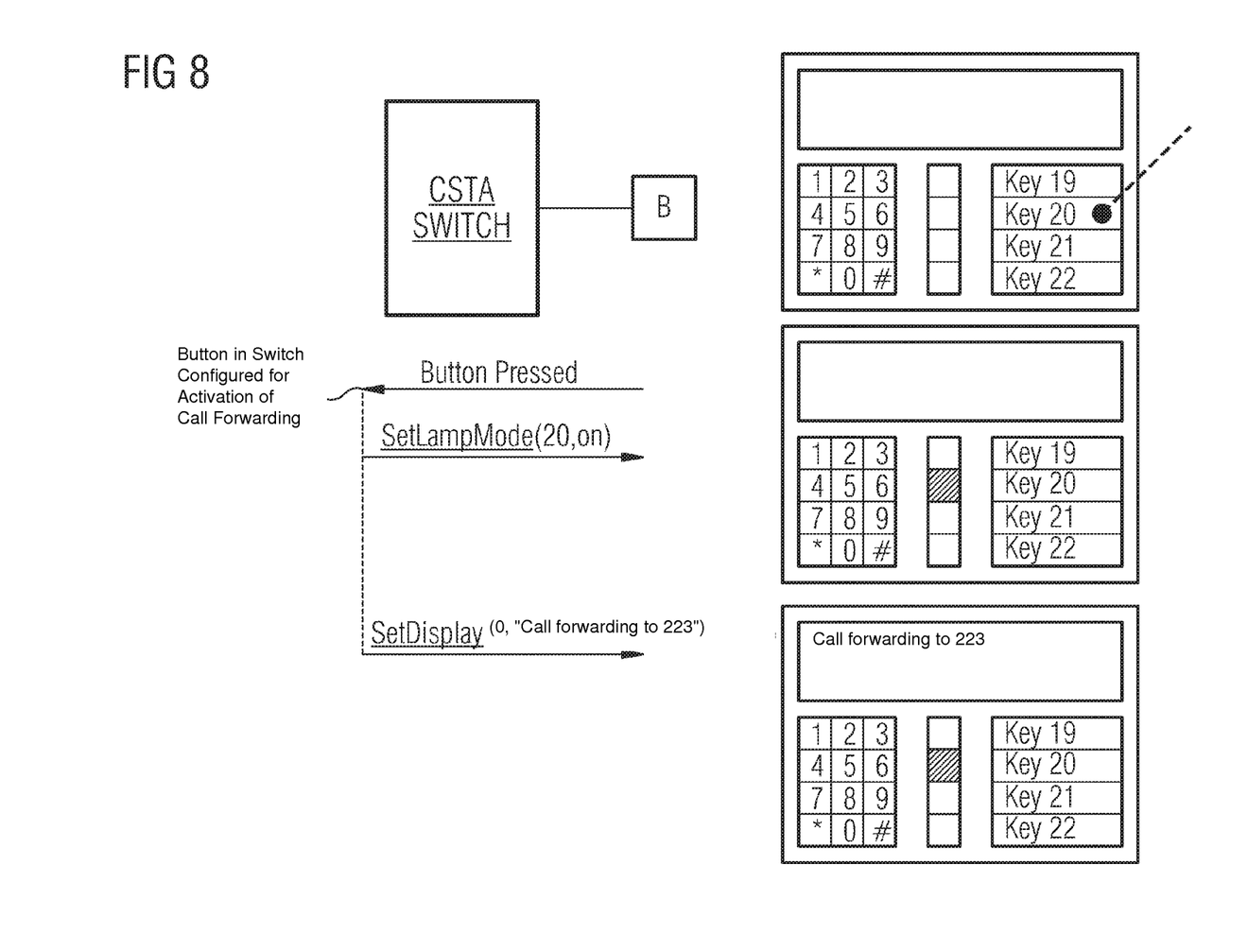
FIG. 8—shows a schematic of a flow for the Stimulus operating mode.

The inventive expansion or, as the case may be, application of CSTA will also make the Stimulus and Functional operating modes possible, as shown schematically in FIG. 8.

The Functional operating mode is therein made possible by applying what are termed Call Control Services and Events, while the Stimulus operating mode is achieved using existing Physical Device Features and Events.

For both operating modes it is therein irrelevant from the viewpoint of the CSTA protocol whether the device is what is termed a soft client or a hardware terminal.

What is not shown therein is an example of a Functional operating mode. The Call Control Services and Events mentioned therein enable controlling in the form of allowing message traffic to be realized independently of the terminal's control elements. The Services and Events therein relate in each case to the calls requiring to be controlled.

For example a Consultation Call Service is applied to an existing call, with its being irrelevant within the protocol which control element has been applied.

An example of a Call Control Service flow is that shown in FIGS. 1 and 2 for a MAKECALL Event. Instances of other Call Services include consultation conference and call holding.

Shown schematically in FIG. 8 is a flow for the Stimulus operating mode. It is therein possible with the cited Physical Device Features and Events to operate terminals in a hardware configuration known only to the CSTA SWITCH, meaning that controlling takes place related to hardware elements (LED, key display, speaker), with features being executed in said mode exclusively in the switch.

For example, consultation can be initiated by a Press Button Service, with a key having first had to be assigned the function for that purpose. What is shown is a CSTA switch that controls a terminal B on which a key Key 20 has been configured for activating a call-forwarding operation in such a way that it will take place in the switch. If the key is then actuated and said service activated, the terminal will indicate that fact to the CSTA switch by means of a corresponding message, as is shown by the topmost arrow. The switch then generates a command that in terminal B causes the corresponding key's LED to light up. A command is furthermore generated by the CSTA switch and transmitted to the terminal B, which command causes a corresponding message to be shown on the device's display.

The invention claimed is:

1. A method for providing Voice over Internet Protocol (VoIP) in a communication system, comprising:
   providing a plurality of terminals that function according to VoIP, the terminals comprising a first terminal and a second terminal;
   the first terminal signaling to the second terminal to establish a connection in which at least one of voice data and video data would be transmitted between the first and second terminals via the connection, the signaling from the first terminal comprising a first signaling message that is in accordance with Computer Supported Telecommunication Applications (CSTA) protocol so that separate signaling in accordance with Session Initiation Protocol (SIP) is not used to establish the connection and only a single signaling protocol is used to establish the connection such that no translation of any protocols is used for signaling exchanged between the first terminal and second terminal to establish the connection, the first signaling message comprising at least one item of information concerning VoIP-related realtime data;
   the second terminal receiving the first signaling message such that no translation of the protocol of the first signaling message occurs for the second terminal to respond to the first signaling message and accept the connection; and
   the second terminal signaling the first terminal in response to the signaling from the first terminal to accept the connection to establish the connection, the signaling of the second terminal comprising a second signaling message, wherein the second signaling message is in accordance with CSTA and has at least one item of information concerning VoIP-related realtime data.

2. The method as claimed in claim 1, wherein at least data necessary in keeping with the Realtime Transport Protocol (RTP) for transmitting a data stream is added as the at least one item of information concerning VoIP-related realtime data.

3. The method as claimed in claim 2, wherein the at least one item of information concerning VoIP-related realtime data identifies at least an address, port number, type of media, and codec employed.

4. The method as claimed in claim 3, wherein the at least one item of information concerning VoIP-related realtime data is also comprised of data defining signaling tones.

5. The method as claimed in claim 4, wherein the data defining signaling tones is organized such that at least one tone is identified by information that relates to a tone to be generated and identifies at least a frequency, an interval, and a tone level for the tone to be generated.

6. The method as claimed in claim 5, wherein the at least one item of information concerning VoIP-related realtime data is transmitted as a function of at least one property of the second terminal.

7. The method as claimed in claim 6, wherein the first signaling message is transmitted in Transport Layer Security socket encrypted form.

8. The method as claimed in claim 1 further comprising a switch device receiving the first signaling message and sending an offering message to the second terminal that contains the at least one item of information concerning VoIP-related realtime data.

9. The method as claimed in claim 8, further comprising the switch device receiving an accept message from the second terminal that comprises at least one item of information concerning VoIP-related realtime data relating to the second terminal and wherein the signaling from the second terminal to accept the connection to establish the connection is comprised of the switch device sending a message to the first terminal that comprises the at least one item of VoIP-related realtime data of the accept message, wherein the accept message is the second signaling message.

10. The method as claimed in claim 9, wherein the at least one item of information concerning VoIP-related data relating to the second terminal is comprised of at least an address of the second terminal, port number of the second terminal and data defining signaling tones to be emitted by the first terminal.

11. The method as claimed in claim 1 wherein the first signaling message is sent to the second terminal without a switch device involved in transmission of the first signaling message to the second terminal and the second signaling message is sent to the first terminal without a switch device involved in transmission of the second signaling message to the first terminal.

12. The method of claim 1 wherein the first signaling message is in accordance with CSTA protocol so that separate signaling in accordance with H.323 protocol is not used to establish the connection and no translation of the protocol of the first signaling message is used when signaling between the first and second terminals is exchanged to establish the connection.

13. The method of claim 1 wherein the first signaling message is not in SIP protocol and wherein a switch device is involved in transmitting the first signaling message to the second terminal.

14. A communication system comprising:
a plurality of terminals, the terminals comprising a first terminal and a second terminal; and
the first terminal configured to send signaling to the second terminal to establish a connection in which at least one of voice data and video data would be transmitted between the first and second terminals via the connection, the signaling from the first terminal comprising a first signaling message that is in accordance with Computer Supported Telecommunication Applications (CSTA) protocol so that separate signaling in accordance with any other protocol is not used to establish the connection and only a single signaling protocol is used to establish the connection such that no translation of the protocol of the first signaling message is used when signaling between the first and second terminals is exchanged to establish the connection, the first signaling message comprising at least one item of information concerning Voice over Internet Protocol (VoIP) related realtime data;
the second terminal configured to receive the first signaling message such that no translation of the protocol of the first signaling message occurs for the second terminal to respond to the first signaling message and accept the connection; and
the second terminal configured to signal the first terminal in response to the signaling from the first terminal to accept the connection to establish the connection, the signaling of the second terminal comprising a second signaling message, wherein the second signaling message is in accordance with CSTA and has at least one item of information concerning VoIP-related realtime data.

15. The system of claim 14 further comprising a switch device, the switch device configured to receive the first signaling message and send an offering message to the second terminal that contains the at least one item of information concerning VoIP-related realtime data.

16. The system of claim 15 wherein the switch device is configured to receive an accept message from the second terminal that comprises at least one item of information concerning VoIP-related realtime data relating to the second terminal and wherein the signaling from the second terminal to accept the connection to establish the connection is comprised of the switch device sending a message to the first terminal that comprises the at least one item of VoIP-related realtime data of the accept message, the accept message being the second signaling message.

17. The system of claim 15 wherein the switch device is a CSTA switch.

18. The system of claim 14 wherein the first signaling message is in accordance with CSTA protocol so that separate signaling in accordance with H.323 protocol is not used to establish the connection and no translation of the protocol of the first signaling message is used when signaling between the first and second terminals is exchanged to establish the connection.

19. The system of claim 14 wherein the first signaling message is not in SIP protocol and a switch device is involved in transmitting the first signaling message to the second terminal.

* * * * *